United States Patent

Haga et al.

[11] Patent Number: 5,867,350
[45] Date of Patent: Feb. 2, 1999

[54] MAGNETO-RESISTANCE EFFECT HEAD WITH INSULATED BIAS CONDUCTOR EMBEDDED IN SHIELD GROOVE

[75] Inventors: Shuichi Haga; Mamoru Sasaki; Hideo Suyama, all of Miyagi; Nobuhiro Sugawara, Kanagawa; Akio Takada, Miyagi; Mikiya Kurosu, Miyagi; Chizuru Ohshima, Miyagi, all of Japan

[73] Assignee: Sony Corporation, Tokyo, Japan

[21] Appl. No.: 819,322

[22] Filed: Mar. 18, 1997

Related U.S. Application Data

[63] Continuation of Ser. No. 412,715, Mar. 29, 1995, abandoned.

[51] Int. Cl.$^6$ .................................. G11B 5/39; G11B 5/11
[52] U.S. Cl. ............................................. 360/113; 360/128
[58] Field of Search ........................................ 360/113, 128

[56] References Cited

U.S. PATENT DOCUMENTS

| 4,356,523 | 10/1982 | Yeh ........................................ 360/113 |
| 4,613,918 | 9/1986 | Kanai et al. ........................... 360/113 |
| 5,247,413 | 9/1993 | Shibata et al. ........................ 360/113 |
| 5,272,582 | 12/1993 | Shibata et al. ........................ 360/113 |
| 5,535,077 | 7/1996 | Saito et al. ............................ 360/113 |
| 5,583,726 | 12/1996 | Mizoshita et al. .................... 360/113 |

FOREIGN PATENT DOCUMENTS

| 0459404 | 12/1991 | European Pat. Off. ............... 360/113 |
| 0574896 | 12/1993 | European Pat. Off. ............... 360/113 |
| 61-073220 | 4/1986 | Japan .................................... 360/113 |
| 63-181108 | 7/1988 | Japan .................................... 360/113 |
| 5-334626 | 12/1993 | Japan .................................... 360/113 |
| 6-203337 | 7/1994 | Japan .................................... 360/113 |

OTHER PUBLICATIONS

Patent Abstracts of Japan, vol. 009, No. 304, (P–409), JP-A-60-136019, Suyama Hideo et al., Jul. 19, 1985.
Patent Abstracts of Japan, vol. 006, No. 222, (E–140), JP-A-57-126187, Kitada Masahiro et al., Aug. 5, 1982.

*Primary Examiner*—Craig A. Renner
*Attorney, Agent, or Firm*—Hill & Simpson

[57] ABSTRACT

A magneto-resistance effect magnetic head having a uniform bias distribution and adapted for avoiding shorting between a magneto-resistance device and a bias conductor wherein a magneto-resistance device 5 and a bias conductor 6 for applying a bias magnetic field to the magneto-resistance device 5 are interposed between a lower shielding magnetic member 1 and an upper shielding magnetic member 2. The bias conductor is embedded in a groove formed in the shielding magnetic member provided on the opposite side of forward and rear electrodes with respect to the magneto-resistance effect device.

1 Claim, 11 Drawing Sheets

CONVENTIONAL DEVICE

CONVENTIONAL DEVICE

MAGNETO-RESISTANCE EFFECT HEAD WITH INSULATED BIAS CONDUCTOR EMBEDDED IN SHIELD GROOVE

This is a continuation, of application Ser. No. 08/412,715 filed Mar. 29, 1995 now abandoned.

BACKGROUND OF THE INVENTION

This invention relates to a magneto-resistance effect magnetic head which may be employed for reading out information recorded on a magnetic recording medium, such as a hard disc.

Recently, developments in a magneto-resistance effect magnetic head (MR head) employing a magneto-resistance effect element (MR element) exhibiting the magneto-resistance effect, such as permalloy, are proceeding vigorously.

The MR head is designed to read out information recorded on the magnetic recording medium by detecting changes in resistance of the MR element by a signal magnetic field leaked out of the magnetic recording medium.

Such a magnetic head, which is superior to typical magnetic induction magnetic head in short wavelength sensitivity, is thought to afford high sensitivity in narrow track reproduction, short wavelength reproduction in ultra-low speed reproduction.

The MR head has an MR element 103, sandwiched between a pair of shielding magnetic members 101, 102, and a bias conductor 104 arranged on the MR element 103 for applying the bias magnetic field thereto, as shown in FIG. 1. The bias magnetic field, induced by the bias current supplied to the bias conductor 104, is applied to the MR element 103 towards the rear side from a surface 105 adapted to have sliding contact with the magnetic recording medium.

If the bias conductor 104 is provided directly above the MR device 103, the following inconveniences arise. First, waveform distortion is produced in the lone waveform A indicative of changes in the magnetic flux acting on respective positions of the MR device 103, as shown in FIG. 2. If there is any waveform distortion, linear recording density cannot be increased, such that the recording capacity of the recording medium cannot be increased. Among the causes of such waveform distortion is the non-uniformity in the distribution of the bias magnetic field.

Such non-uniformity in the distribution of the bias magnetic field is produced by the bias magnetic flux entering the MR device 103 and leaking to an underlying layer of the shielding magnetic member 101. Should there be such non-uniformity in the distribution of the bias magnetic field, the region of the MR device having high bias magnetic field strength is magnetically saturated in a short time, such that the signal magnetic flux cannot enter such region. On the other hand, should there be any variation in the intensity of the bias magnetic field, the operating point tends to be shifted to the non-linear region of the MR sensitivity characteristics, thus producing distortion in the playback waveform.

Second, if the shield magnetic member 101 is present directly below the MR device 103, the magnetic wall is shifted due to disturbance in the core magnetic domain, thus producing Barkhausen noise.

SUMMARY OF THE INVENTION

In view of the foregoing, it is an object of the present invention to provide an MR head exhibiting uniform bias magnetic field distribution, improved linearity and improved bias efficiency.

It is another object of the present invention to provide a method for producing a highly reliable MR head in which the bias conductor is embedded in the groove formed in the lower shielding magnetic member without being protruded therefrom and in which there is no risk of shorting between the MR device and the bias conductor due to reduced gap width.

The MR head of the present invention is a vertical type MR head of a shielded structure in which a MR device having its longitudinal direction at right angles to a facing surface to a magnetic recording medium is sandwiched between a pair of shielding magnetic members. With the MR head, a forward electrode and a rear electrode are arranged ahead and at a back of the MR device, and a bias conductor is provided for applying the bias magnetic field to the MR device.

According to the present invention, the bias conductor is embedded in a groove formed in the shielding magnetic member provided on the opposite side of forward and rear electrodes with respect to the magneto-resistance effect device.

Although the bias conductor may be a single-layer metal film, it is preferably of a three-layer structure having Ti, Cu and Ti films.

The bias conductor is embedded in a groove formed only in the lower shielding magnetic member and has its connection portion to a bias lead-out conductor formed at the site of the lower shielding magnetic member. The lower shielding magnetic member is larger in size than the upper shielding magnetic member and the connecting portion between the bias lead-out conductor and the bias conductor in the groove is not overlapped with the upper shielding magnetic member.

With the method for producing the MR head according to the present invention, a groove is formed in a lower shielding member formed on a base plate, and a first insulating film is formed on the lower shielding magnetic member inclusive of the groove. A metal film is formed on the first insulating film. The metal film is etched so that the metal film is left only in the groove and is not protruded from the groove, for forming a bias conductor. A second insulating film is formed on the lower shielding magnetic member inclusive of the groove, and the second insulating film is ground to a planar surface until exposure of the lower shielding magnetic member. Finally, the ground surface of the lower shielding magnetic member is planarized.

With the MR head according to the present invention, since the bias conductor is embedded in the groove formed in the shielding magnetic member provided on the opposite side of forward and rear electrodes with respect to the magneto-resistance effect device, the distance between the MR device and the shielding magnetic member is increased, thus decreasing leakage of the bias magnetic field entering the MR device towards the shielding magnetic member. The result is that the bias distribution of the bias magnetic field applied to the MR device becomes more uniform thereby improving linearity and reducing distortion in the reproduced waveform.

In addition, since the groove in which to embed the bias conductor is formed only in the lower shielding magnetic member, and the connecting portion of the bias conductor to the bias lead-out conductors is provided in the site of the lower shielding magnetic member, there is no step difference produced in the groove and at the connecting portion to eliminate inferior coating at the step portion or at the connecting portions as well as breakage of the bias conductor.

With the method for producing the MR head according to the present invention, the metal film formed on the lower shielding magnetic member inclusive of the groove is etched so as to be left only in the groove without any protruding portions. Thus the ground surface of the lower shielding magnetic member is planarized by grinding the insulating film formed on the lower shielding magnetic member until exposure of the lower shielding magnetic film.

With the above-described MR head of the present invention, since the bias conductor is embedded in a groove formed in the shielding magnetic member provided on the opposite side of forward and rear electrodes with respect to the magneto-resistance effect device, and the distance between the MR device and the shielding magnetic member is increased for preventing the bias magnetic field entering the MR device from being leaked towards the shielding magnetic member, more uniform distribution of the bias magnetic field applied to the MR device may be achieved for improving linearity and eliminating distortion in the playback waveform.

With the MR head of the present invention, since the bias conductor is completely embedded so as not to be protruded from the groove, it becomes possible to avoid shorting between the bias conductor and the MR device formed thereon. Above all, since the surface of the insulating film in the groove having the bias conductor embedded therein is planarized, a sufficient distance between the MR device and the bias conductor is maintained even if the gap film formed thereon is reduced in width, thus prohibiting shorting between the MR device and the bias conductor.

In addition, since the groove in which to embed the bias conductor is formed only in the lower shielding magnetic member, there is produced no step difference in the groove or at the connecting portion to eliminate inferior coating at the step portion or the connecting portions as well as breakage of the bias conductor. Since there is no step difference produced in the groove, inferior insulation between the bias conductor and the lower shielding magnetic member may be prohibited more reliably. Since the bias conductor in the groove presents a uniform height, the bias conductor is not exposed from the upper surface of the lower shielding magnetic member. Thus it becomes possible to avoid the grinding of the bias conductor by planar grinding and inferior conduction of the bias conductor.

With the method for producing the MR head of the present invention, since the groove formed in the lower shielding member may also be planarized, it becomes possible to prevent shorting between the bias conductor and the MR device formed thereon via a gap film. Thus the shorting between the MR device and the bias conductor may be avoided even if the gap film is reduced in thickness for reducing the gap width for coping with high density recording. In addition, insulation of the gap film formed on the planarized groove may be assured and improved tightness in bonding may be achieved simultaneously.

DESCRIPTION OF THE PREFERRED EMBODIMENTS

Figure 1:
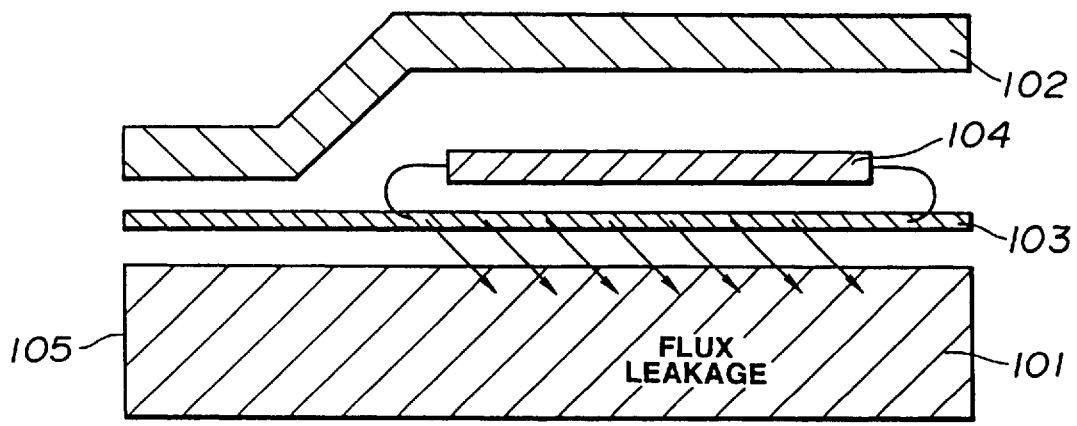
FIG. 1 is an enlarged cross-sectional view showing a conventional MR head.
Figure 2:
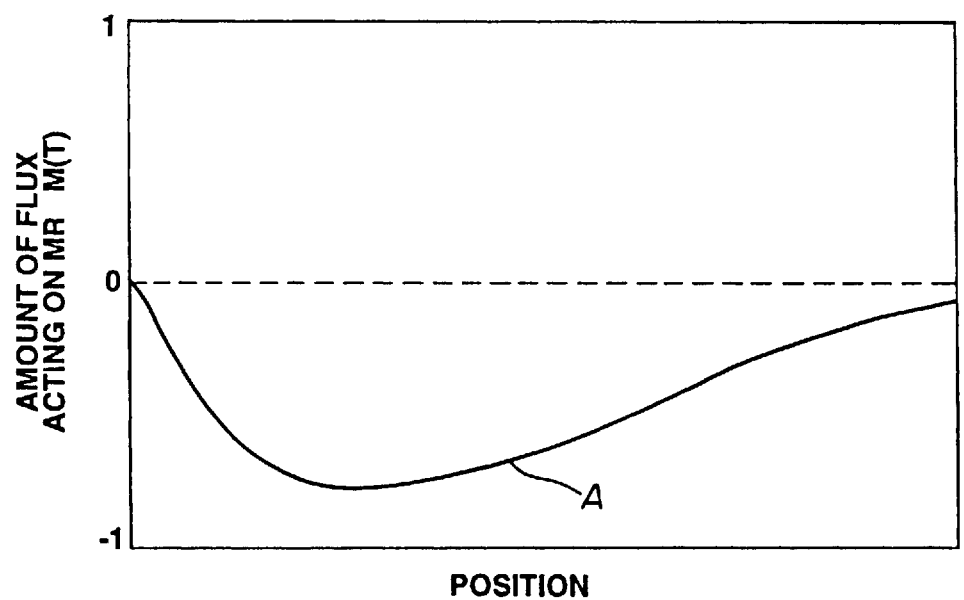
FIG. 2 is a graph showing the amount of magnetic flux acting on the MR device of conventional design.

Referring to the drawings, preferred illustrative embodiments of the present invention will be explained in detail.

Figure 3:
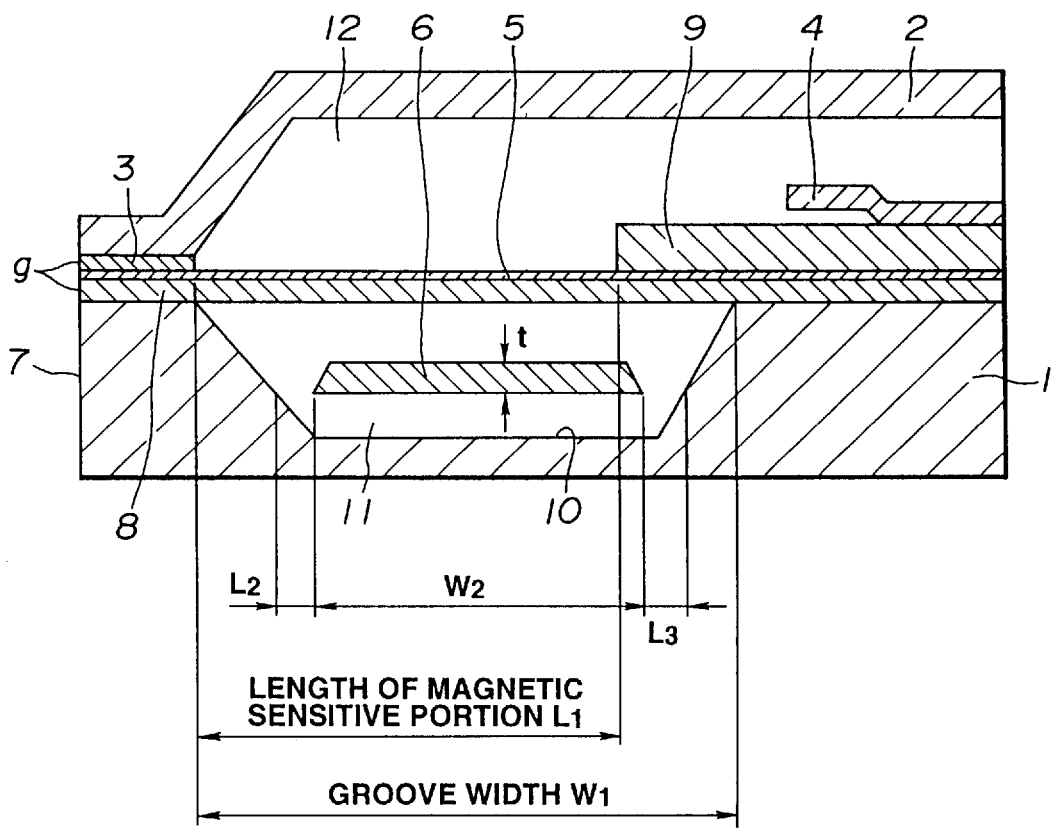
FIG. 3 is an enlarged cross-sectional view of an MR head according to the present invention.
Figure 4:
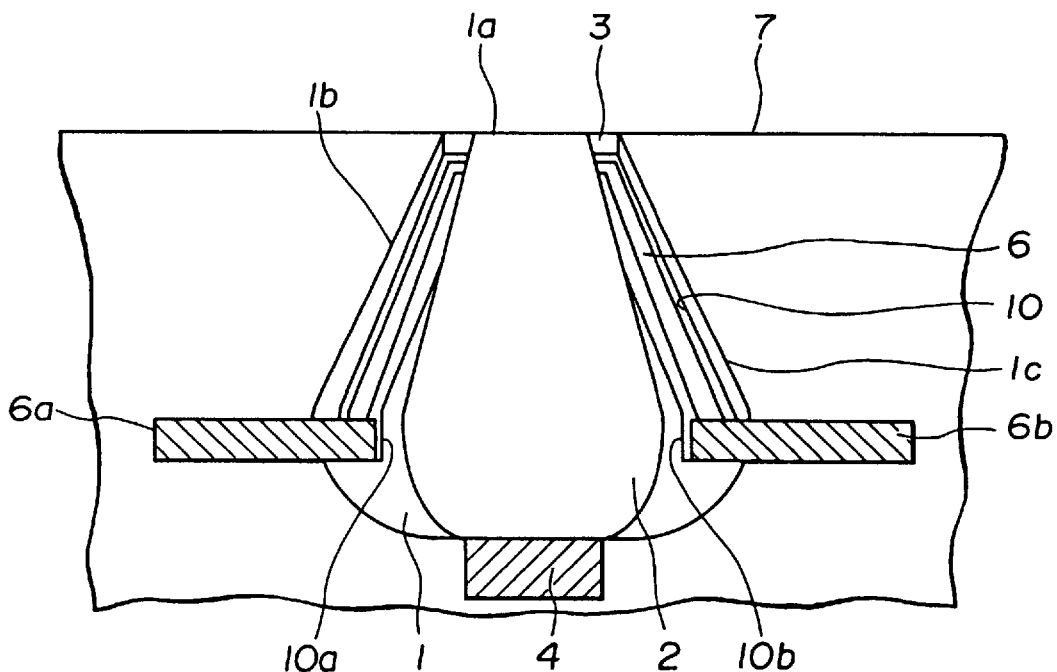
FIG. 4 is a plan view of an MR head according to the present invention.

An MR head of the embodiment illustrated includes a pair of shielding magnetic members 1 and 2, formed on a lateral surface, not shown, of a base plate, termed a slider, an MR device 5 arranged between the shielding magnetic members 1 and 2 and having a forward electrode 3 and a rear electrode 4 laminated thereon, and a bias conductor 6 for applying a bias magnetic field to the MR device 5, as shown in FIGS. 3 and 4.

The shielding magnetic member formed as a lower layer is termed the lower shielding magnetic member 1, and the shielding magnetic member formed as an upper layer is termed the upper shielding magnetic member 2.

The MR device 5 is formed as a substantially rectangular pattern in plan, and has its longitudinal direction perpendicular to an abutment surface (ABS surface) 7 with respect to a magnetic recording medium, not shown. The MR device 5 has its forward lateral side exposed on the ABS surface 7.

Such MR device 5 is formed as a magnetic thin film of permalloy or the like and deposited by vacuum thin film forming means, such as vapor deposition or sputtering, on a gap film 8 provided on the lower shielding magnetic member 1. For the gap film 8, a film of e.g., $Al_2O_3$ is employed.

While the MR device 5 may be a single layer thin MR film of e.g., permalloy, it may be a pair of laminated thin MR films magnetostatically coupled to each other via a non-magnetic insulating layer of e.g., $SiO_2$. The laminated structure is effective to avoid the Barkhausen effect.

The forward electrode 3, electrically connected to the MR device 5, is directly laminated on a forward portion of the MR device 5 so that its lateral side is exposed on the ABS surface 7. Such forward electrode 3 not only has the function of an electrode for supplying the sense current to the MR device 5, but also has the function of a gap film for a playback magnetic gap g.

The rear electrode 4 is laminated on a rear portion of the MR device 5 via a flux guide 9 for assuring improved capturing of the signal magnetic flux and a more uniform distribution of the bias magnetic field. The flux guide 9 is formed of a high permeability material, such as permalloy or an amorphous material, e.g., a CoZr based material, for improving the capturing of the signal magnetic flux entering the MR device 5. The flux guide 9 may be prepared by vacuum thin film forming means, such as sputtering, vapor deposition or plating.

The rear electrode 4 may be directly laminated in part on the rear portion of the MR device 5, in which case the flux guide 9 may be laminated on the rear portion of the rear electrode 4.

The bias conductor 6, used for applying the bias magnetic field on the MR device 5, is arranged in a groove 10 formed in the lower shielding magnetic member 1 on the opposite side of the MR device 5 with respect to the forward electrode 3 and the rear electrode 4, at a position intermediate between the electrodes 3 and 4, and is embedded in an insulating film 11. In other words, the bias conductor 6 is completely housed within and is not protruded from the groove 10.

Figure 5:
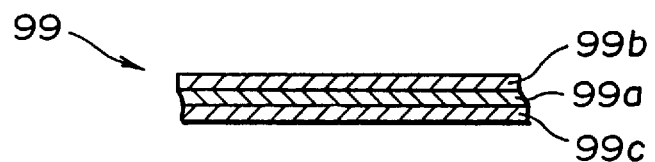
FIG. 5 is an enlarged cross-sectional view showing essential portions of an MR head of the present invention having a laminated structure on the bias conductors.

The bias electrode 6 is formed of a metallic material which is low in resistance and excellent in electrical conductivity, such as Cu. Although the bias conductor 6 may be a single layer of Cu, it is preferably of a laminated film structure such as the bias conductor 99 in which an intermediate Cu film 99a is sandwiched along the film thickness direction between laminated films 99b and 99c of Ti, for achieving better bonding to the insulating film 11 provided therearound, as shown in FIG. 5.

In addition, the bias conductor 6 is provided for extending in a direction substantially at right angles to the longitudinal direction of the MR device 5, that is in a direction normal to the drawing sheet. The bias current is applied from a dc source, not shown, across both terminal ends of the bias conductor. Thus the dc current flows in the direction of the track width or in the longitudinal direction of the bias conductor 6, so that the bias magnetic field is applied in the longitudinal direction of the MR device 5 which is the direction normal to the ABS surface 7.

In the embodiment illustrated, the bias conductor 6 has a thickness t equal to 50 to 200 nm and a width $W_2$ equal to 1 µm to 8 µm, for applying a bias magnetic field of a pre-set magnitude to the MR device 5. The facing distances $L_2$ and $L_3$ between the bias conductor 6 and the lower shielding magnetic member 1 in a direction normal to the ABS surface 7 are selected to be 0.1 µm to 2 µm in view of insulation. The facing distance between the bias conductor 6 and the MR device 5 is selected to be 0.1 µm to 2 µm for reducing the gap width.

The insulating film 11, in which the bias conductor 6 is embedded, is preferably formed of $Al_2O_3$, $SiO_2$, SOG (silicon on glass) or $Si_3N_4$ for assuring good insulation properties with respect to the bias conductor 6. The film thickness of the lower portion of the insulating film 11, provided below the bias conductor 6, is preferably on the order of 0.1 µm to 1 µm for assuring positive insulating properties with respect to the bias conductor 6.

The groove 10 for embedment of the bias conductor 6 therein is formed only in the lower shielding magnetic member 1, as shown in FIG. 4. In other words, the groove 10 is not formed in any other portion than the lower shielding magnetic member 1. The groove 10 is formed in the lower shielding magnetic member 1 as a substantially U-shaped groove in plan and is delimited by a terminal side 1a parallel to the ABS surface 7 of the lower shielding magnetic member 1 and both lateral sides 1b, 1c each extending at an oblique angle with respect to the terminal side 1a. In addition, the groove 10 is formed as a substantially U-shaped groove dimensioned to hold the bias conductor 6 therein.

The groove 10 has two terminal portions 10a, 10b acting as connecting portions between the bias conductor 6 embedded in the groove 10 and bias lead-out conductors 6a, 6b for supplying the current to the bias conductor 6. These connecting portions also are provided at the site of the lower shielding magnetic member 1. At these connecting portions, the bias conductor 6 and the bias lead-out conductors 6a, 6b are electrically connected to each other.

In the embodiment illustrated, for a length $L_1$ of a magnetically sensitive portion, that is the distance between the rear end of the forward electrode 3 to the distal end of the flux guide 9, is equal to 6 μm, an opening width $W_1$ of the groove 10 is set to 8 μm, with the rear end of the forward electrode 3 being coincident with the forward end of the groove 10.

The upper shielding magnetic member 1 and the lower shielding magnetic member 2, provided for sandwiching the MR device 5 from its upper and lower sides, act as a shield for shielding the effect of the magnetic field from the recording medium spaced apart from the MR device 5, and is formed of, for example, permalloy. Of these upper and lower shielding magnetic members 1 and 2, the lower shielding magnetic member 1 is provided for extending at right angles to the ABS surface 7, so that its lateral side is exposed on the ABS surface 7. The lower shielding magnetic member 1 is formed as a pattern larger in size than the upper shielding magnetic member 2 formed thereon.

The upper shielding magnetic member 2, provided facing the lower shielding magnetic member, is similarly provided for extending towards rear at right angles to the ABS surface 7, so that its lateral side is exposed on the ABS surface 7. The upper shielding magnetic member 2 is directly laminated on the forward electrode 3 on the side of the ABS surface 7, while being laminated on the rear side via an insulating layer 12. The upper shielding magnetic member 2 is dimensioned for exposing the groove 10 except a portion parallel to the ABS surface 7 and for not being overlapped with the connecting portions between the bias conductor 6 and the bias lead-out conductors 6a, 6b.

Figure 6:
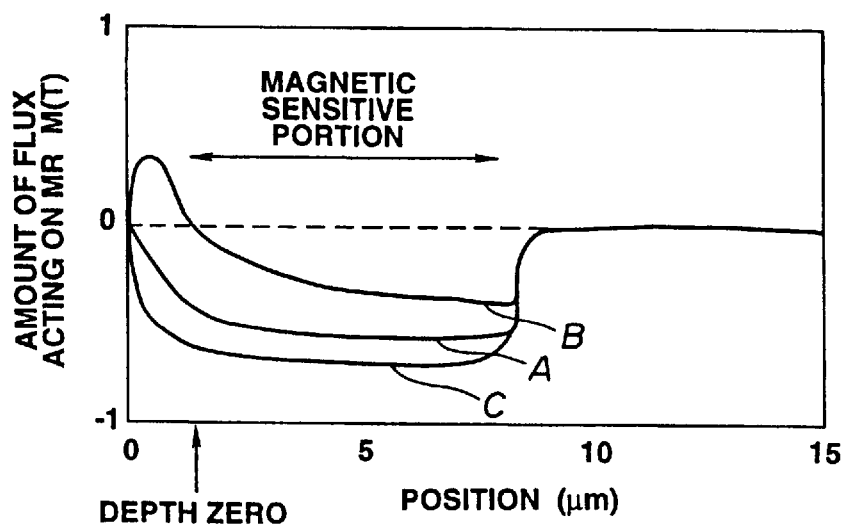
FIG. 6 is a characteristic view showing the results of simulation of the bias distribution of the MR head.

The above-described MR head has the bias magnetic field distribution as shown in FIG. 6. The waveforms A, B and C show simulated states in which only the bias magnetic field is applied, a signal magnetic field of positive polarity is applied in addition to the bias magnetic field and in which a signal magnetic field of negative polarity is applied in addition to the bias magnetic field, respectively.

It is seen from the above results that the bias magnetic field is uniformly applied in the magnetically sensitive portion of the MR device 5. This is ascribable to the fact that the groove 10 is formed in the lower shielding magnetic member 1 and the bias conductor 6 is embedded therein. Specifically, by embedding the bias conductor 6 in the groove 10 of the lower shielding magnetic member 6, the facing distance between the magnetically sensitive portion and the shielding magnetic members 1 and 2 is increased with the result that the bias magnetic flux entering the MR device 5 becomes less susceptible to leakage into the shielding magnetic member 1.

Figure 7:
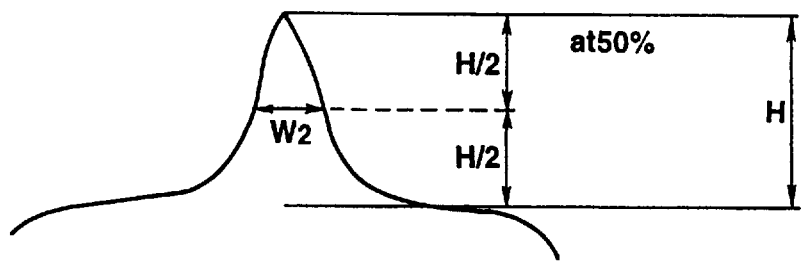
FIG. 7 is a waveform diagram for illustrating PW50.

Measurements were made of the distortion of the lone waveform of the MR head having the bias conductor 6 embedded in the groove 10 of the lower shielding magnetic member 1 and that of an MR head having the bias conductor 6 provided on the MR device 5. The results were evaluated based on the measured PW50 value. The PW50 value stands for the width $W_2$ of the waveform at a height equal to one-half of the height H of the playback waveform shown in FIG. 7. The results are shown in Table 1.

TABLE 1

| Construction | PW50/ns |
|---|---|
| Bias Conductor Embedded in Groove | 0.66 |
| Bias Conductor Directly on MR Device | 0.55 |

It is seen from the above results that the construction with the bias conductor 6 embedded in the groove 10 leads to improved linearity and reduction in distortion in the playback waveform.

With the present MR head, since the bias conductor 6 is completely embedded within the groove 10 via the insulating film 11 without being protruded from the groove 10, a sufficient distance may be maintained between the MR device 5 and the bias conductor 6 even if the gap film 8 is reduced in its film thickness. Consequently, with the MR head of the embodiment illustrated, shorting between the MR device 5 and the bias conductor 6 may be positively avoided even if it is attempted to reduce the gap width.

Figure 8:
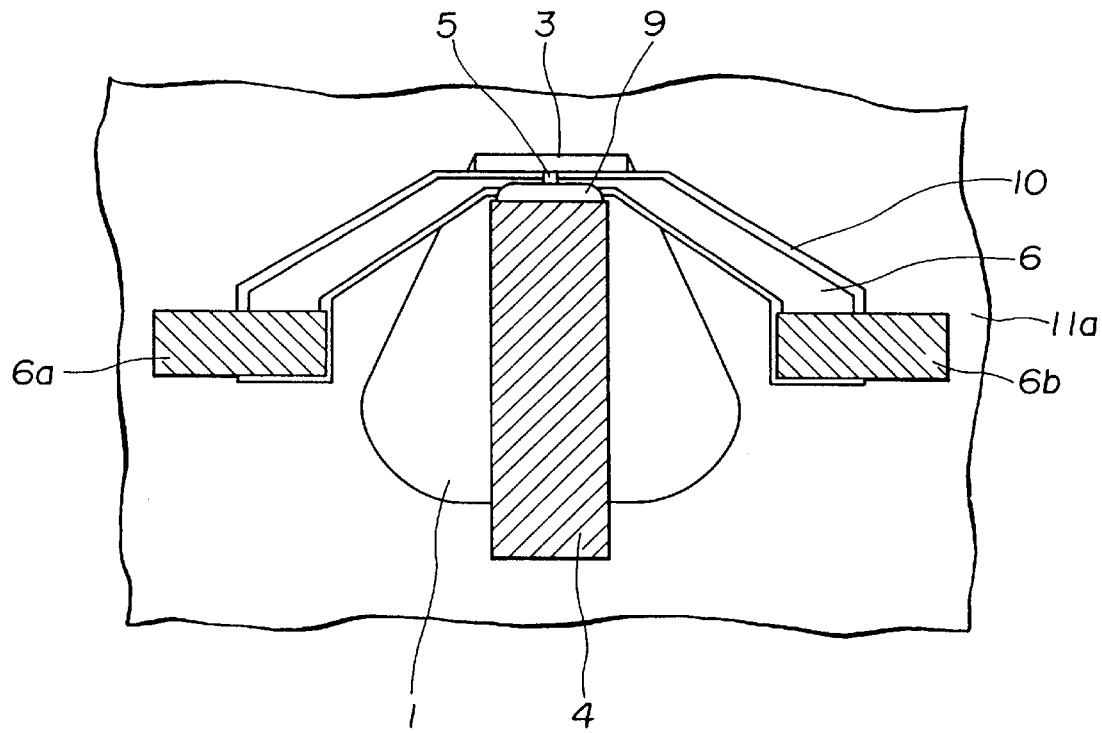
FIG. 8 is a plan view showing an example of an MR head in which a groove for embedment of the bias conductor is formed astride the lower shield magnetic member and a protective film member provided therearound.

Meanwhile, if the groove 10 for embedding the bias conductor 6 therein is formed astride the lower shielding magnetic member 1 and a protective film material 11a of, for example, $Al_2O_3$, formed around the lower shielding magnetic member 1, as shown in FIG. 8, there is produced a step difference at a boundary area due to the difference in the etch rate encountered during etching the groove 10.

The result is breakage of the bias conductor 6 at the step portion or deteriorated insulation properties of the insulating film 11 between the lower shielding magnetic member 1 and the bias conductor 6 thus leading to inferior insulation. Since the step difference is produced in the groove 10, there is similarly produced a step difference in the bias conductor 6 formed in the groove 10. Due to the difference in he etch rate, the step difference at the protective film 11a is higher than that at the lower shielding magnetic member 1. Thus the bias conductor 6 formed in the protective film material 11a is ground by planar grinding of the groove such that the bias conductor 6 is partially scraped off or disappears such that the bias conductor 6 cannot be connected to the bias lead-out conductors 6a, 6b.

However, with the MR head of the embodiment illustrated, since the groove 10 in which to embed the bias conductor 6 is formed only in the lower shielding magnetic member 1, the step difference in the groove 10 is eliminated such that inferior coating at the step portion or breakage of the bias conductor 6 may be prevented from occurrence. On the other hand, inferior coating of the insulating film 11 provided above and below the bias conductor 6 is eliminated to prevent inferior coating between the bias conductor 6 and the lower shielding magnetic member 1. Similarly, the connecting portion between the bias conductor 6 and the bias lead-out conductors 6a, 6b is provided at the site of the lower shielding magnetic member 1, so that the connection may be achieved under a state free of step difference.

The method for preparing the above-described MR head is hereinafter explained.

Figure 9:
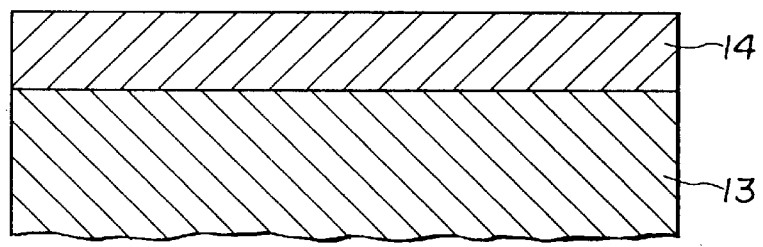
FIG. 9 sequentially shows the process of fabrication of the MR head according to the present invention and specifically shows, in a schematic enlarged cross-section, the process of forming a magnetic film.

A base plate 13 of $Al_2O_3$-TiC is first prepared, as shown in FIG. 9. On the base plate 13 is formed an $Al_2O_3$ film, not shown, for improving insulating properties and surface characteristics.

On the $Al_2O_3$ film is formed a magnetic film 14 of, for example, permalloy or sendust, by sputtering or plating.

Figure 10:
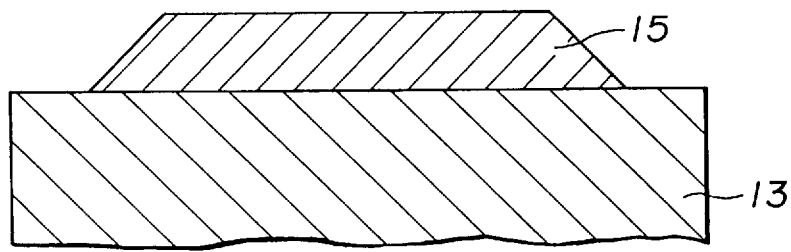
FIG. 10 sequentially shows the process of fabrication of the MR head according to the present invention and specifically shows, in a schematic, enlarged cross-section, the process of forming a lower shielding magnetic member.

The magnetic film 14 then is dry-etched for forming a lower shielding magnetic film 15 of a pre-set shape, as shown in FIG. 10.

Figure 11:
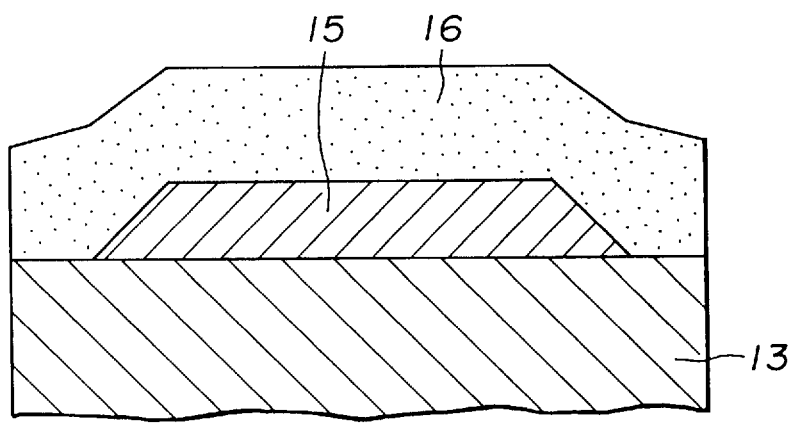
FIG. 11 sequentially shows the process of fabrication of the MR head according to the present invention and specifically shows, in a schematic enlarged cross-section, the process of forming a planarized film.

Then, an $Al_2O_3$ planarized film 16 is then formed for covering the lower shielding magnetic member 15, as shown in FIG. 11.

Figure 12:
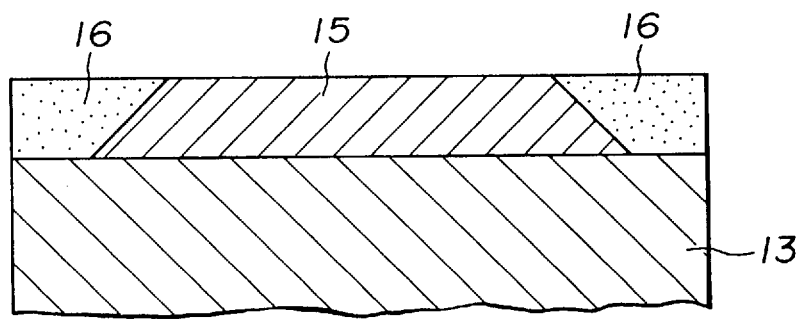
FIG. 12 sequentially shows the process of fabrication of the MR head according to the present invention and specifically shows, in a schematic enlarged cross-section, the process of planarization.

The planarized film 16 then is ground for exposing the lower shielding magnetic member 15, so that the lower shielding magnetic member 15 has a pre-set film thickness, as shown in FIG. 12.

Figure 13:
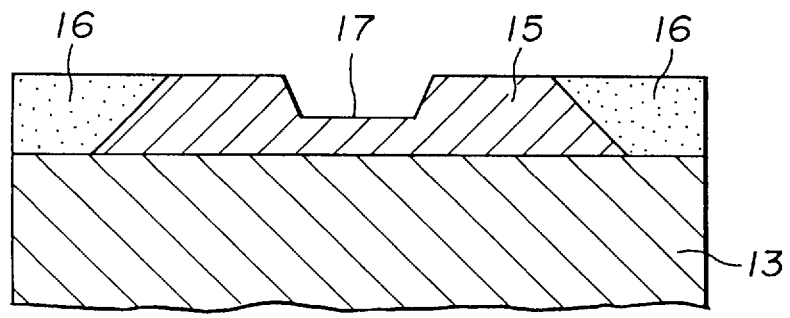
FIG. 13 sequentially shows the process of fabrication of the MR head according to the present invention and specifically shows, in a schematic enlarged cross-section, the process of forming a groove in the lower shielding magnetic member.

The planarized lower shielding magnetic member 15 is then dry-etched to form a groove 17, as shown in FIG. 13. The groove 17 is formed only in the lower shielding magnetic member 1, without being formed astride the lower shielding magnetic member 15 and its perimetral portion.

By forming the groove 17 only in the lower shielding magnetic member 15, breakage of the bias conductor, produced at the boundary between the lower shielding magnetic member 15 and the planarized film 11a provided in its perimetral portion, or inferior insulation between the lower shielding magnetic member 15 and the bias conductor, may be avoided to a larger extent than with the construction shown in FIG. 8.

Figure 14:
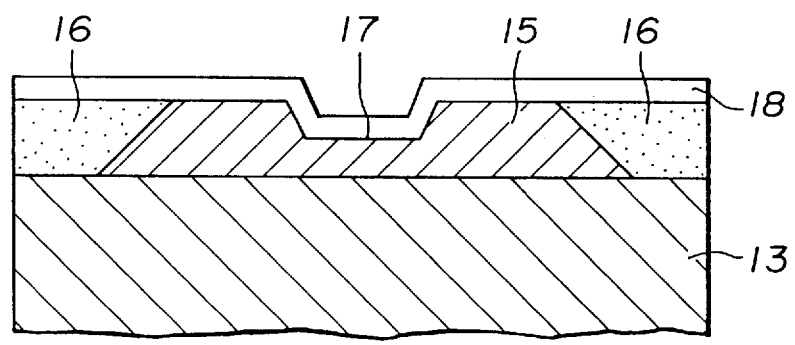
FIG. 14 sequentially shows the process of fabrication of the MR head according to the present invention and specifically shows, in a schematic enlarged cross-section, the process of forming a first insulating film.

Then, $Al_2O_3$ is sputtered on the entire surface, inclusive of the groove 17, for forming a first insulating film 18, as shown in FIG. 14.

Figure 15:
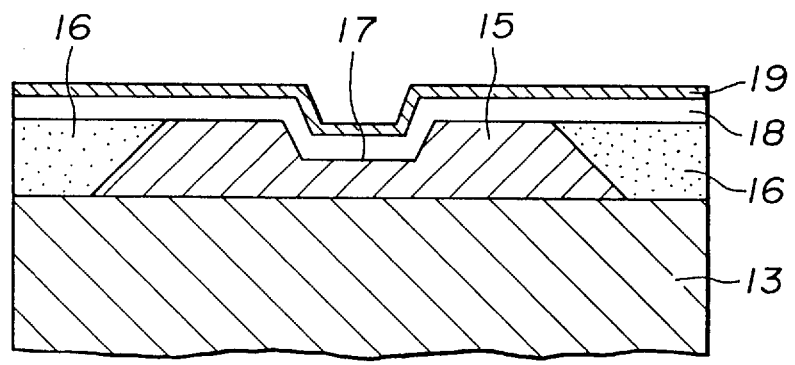
FIG. 15 sequentially shows the process of fabrication of the MR head according to the present invention and specifically shows, in a schematic enlarged cross-section, the process of forming a metallic film.

Then, a metal film 19 is formed by sputtering Cu for forming a bias conductor on the first insulating film 18, as shown in FIG. 15.

Figure 16:
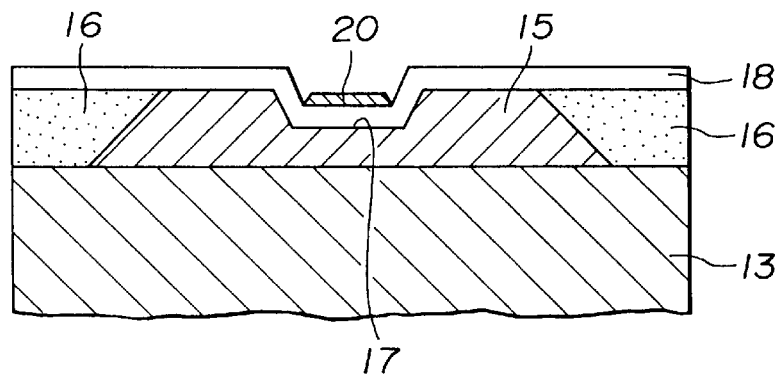
FIG. 16 sequentially shows the process of fabrication of the MR head according to the present invention and specifically shows, in a schematic enlarged cross-section, the process of forming a bias conductor.

A bias conductor 20 as shown in FIG. 16 then is formed by dry etching by patterning so that only the metal film 19 is left in the groove 17 and is not protruded from the groove 17. Thus the bias conductor 20 is completely embedded in the groove 17 without being protruded therefrom.

The first insulating film 18 is etched with the exclusion of the portion formed in the groove 17. The etching used is the island etching.

Figure 17:
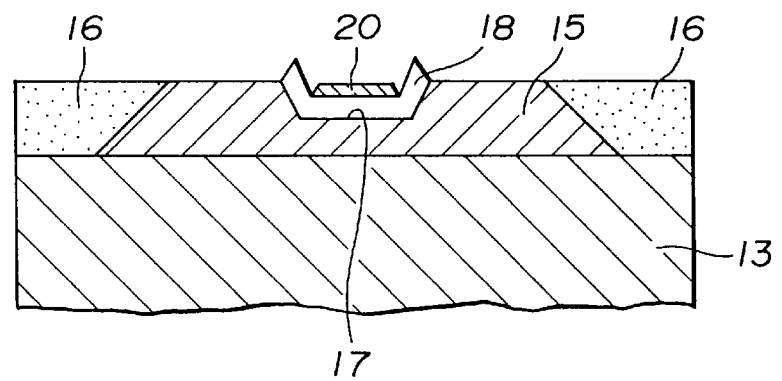
FIG. 17 sequentially shows the process of fabrication of the MR head according to the present invention and specifically shows, in a schematic enlarged cross-section, the process of etching the first insulating film.

The result is that the first insulating film 18 is not left on the lower shielding magnetic member 15 and the first insulating film 18 is left only in the groove 17, as shown in FIG. 17.

Figure 18:
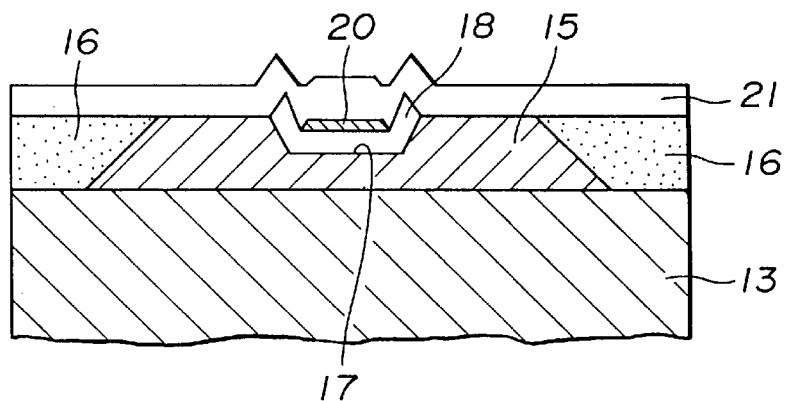
FIG. 18 sequentially shows the process of fabrication of the MR head according to the present invention and specifically shows, in a schematic enlarged cross-section, the process of sputtering a second insulating film.

Then $Al_2O_3$ is sputtered on the lower shielding magnetic member 15, inclusive of the groove 17, for forming a second insulating film 21, as a planarized film, as shown in FIG. 18.

Figure 19:
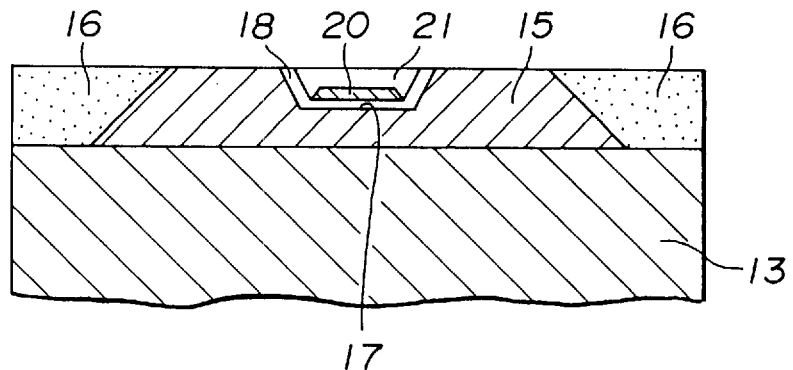
FIG. 19 sequentially shows the process of fabrication of the MR head according to the present invention and specifically shows, in a schematic enlarged cross-section, the process of planarization.

The second insulating film 21 is then ground to a planar surface, until the lower shielding magnetic member 15 is exposed, as shown in FIG. 19. Such planar grinding is performed by buff grinding using a cloth of $SiO_2$ abrasive grains and fibers, occasionally in combination with mechanical grinding using diamond abrasive grains 2 μm in diameter and copper die.

The result is that the ground surface of the lower shielding magnetic member 15 is planarized and has an extremely planar surface with the surface roughness on the order of 1 nm. If buff grinding is used for planarizing the ground surface, grinding may be achieved without dependency upon the warping of the base plate 13 because of the reduced grinding amount achieved with buff grinding, as a result of which fluctuations in groove depth may be eliminated significantly. If the grinding is performed by mechanical grinding, using an abrasive stone, the insulating film 21 is abraded more quickly than the metal film because of the difference in the grinding rate between the bias conductor 20 which is a metal film and the insulating film 21 which is formed of $Al_2O_3$.

Figure 20:
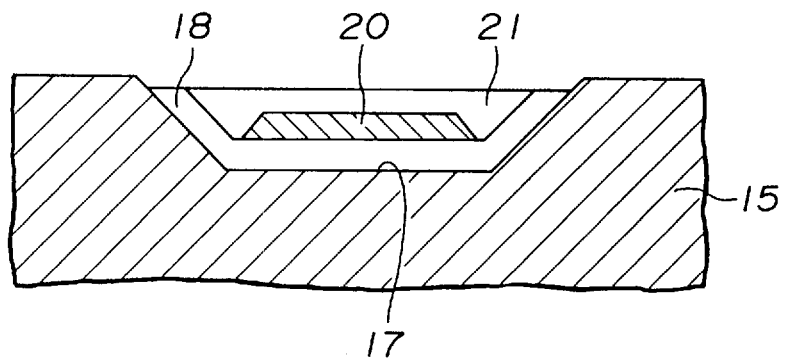
FIG. 20 sequentially shows the process of fabrication of the MR head according to the present invention and specifically shows, in a schematic enlarged cross-section, the groove of FIG. 15 to an enlarged scale.

Although the groove 17 suffers from indentation to a slightly more pronounced extent than the lower shielding magnetic member 15 as a result of the above planarization step, as shown in FIG. 20, the ground surface of the second insulating film 21 of the groove 17 is planarized.

Figure 21:
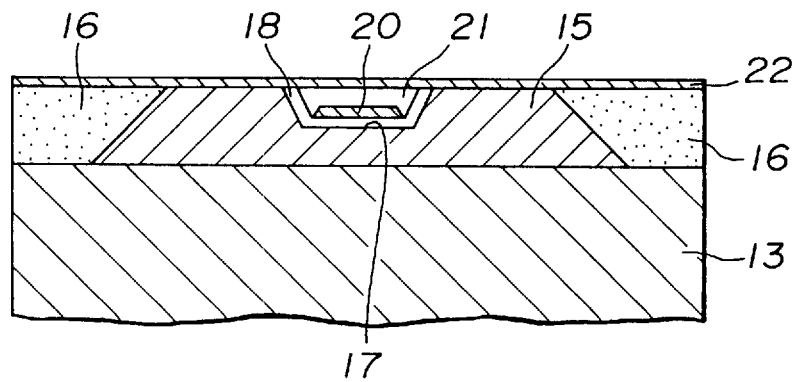
FIG. 21 sequentially shows the process of fabrication of the MR head according to the present invention and specifically shows, in a schematic enlarged cross-section, the process of forming a gap film.

Then, for forming a gap film 22, $Al_2O_3$ is then sputtered on the planarized ground surface, as shown in FIG. 21.

Figure 22:
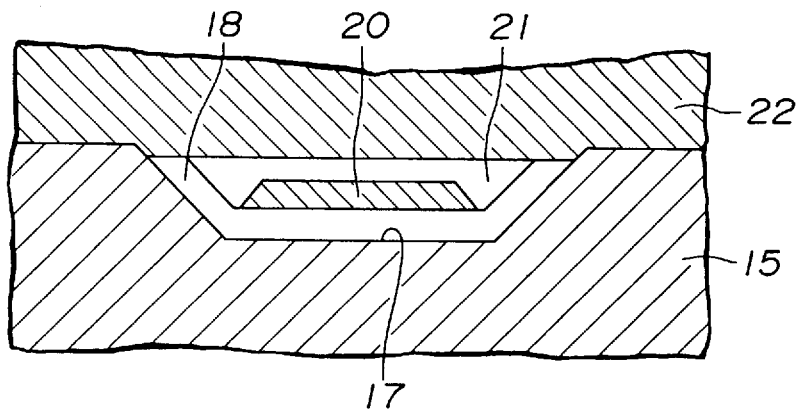
FIG. 22 sequentially shows the process of fabrication of the MR head according to the present invention and specifically shows, in a schematic enlarged cross-section, the groove of FIG. 19 to an enlarged scale.

Since the groove has some indentation, there is produced a slight step difference in the gap film 22, as shown in FIG. 22. However, since the surface of the second insulating film 21 in the groove 17 is planarized, the insulating properties between the gap film 22 and the bias conductor 20 may be maintained, while the bonding between the gap film 22 and the insulating film 21 is improved in tightness and strength.

Figure 23:
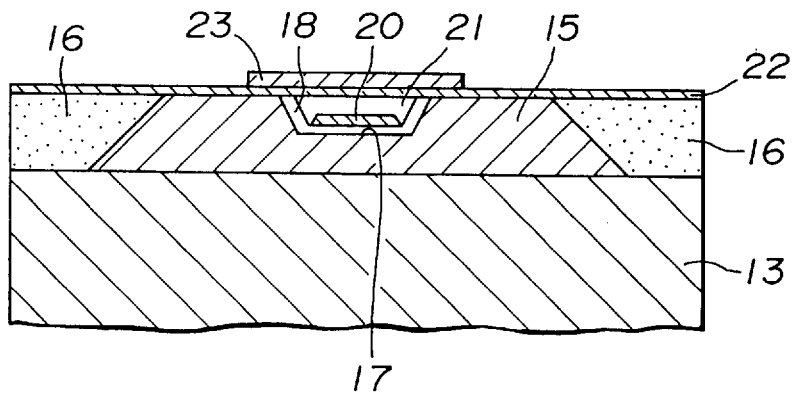
FIG. 23 sequentially shows the process of fabrication of the MR head according to the present invention and specifically shows, in a schematic enlarged cross-section, the process of forming an MR device.

An MR device 23 is then formed on the gap film 22, as shown in FIG. 23.

For forming the MR device 23, permalloy is formed by sputtering and vapor deposition and subsequently the MR device 23 is formed to a rectangular pattern in plan so that its longitudinal direction is normal to the ABS surface.

Figure 24:
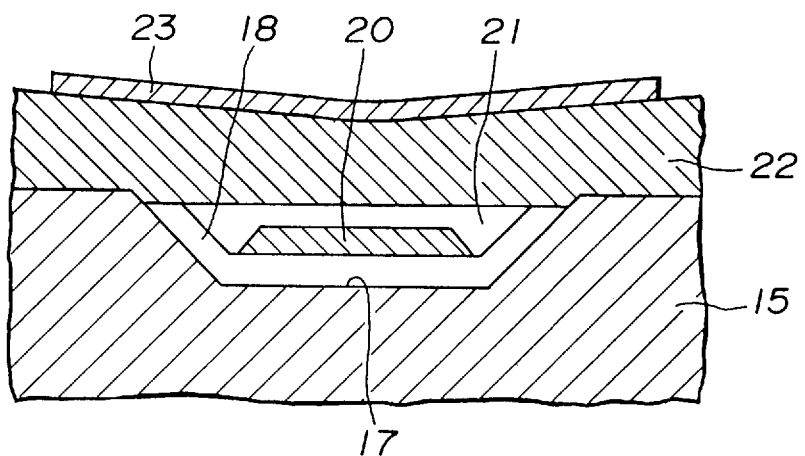
FIG. 24 sequentially shows the process of fabrication of the MR head according to the present invention and specifically shows, in a schematic enlarged cross-section, the groove of FIG. 21 to an enlarged scale.

The state of the MR device 23 in the groove 17 is shown to an enlarged scale in FIG. 24. Since the groove 17 presents a planarized surface by the planarizing process, the facing distance between the bias conductor 20 and the MR device 23 is sufficient to assure electrical insulation by the gap film 22. Consequently, it becomes possible to positively avoid the shorting between the MR device 23 and the bias conductor 20 even although the gap film 22 is reduced in thickness for reducing the gap width.

Although the step of removing the insulating film 18 from other than the groove 17 after forming the first insulating film 18 shown in FIG. 16 is included in the above process, such step may also be omitted and the second insulating film 21 as the planarized film of the next step may also be formed after forming the first insulating film 18.

Figure 25:
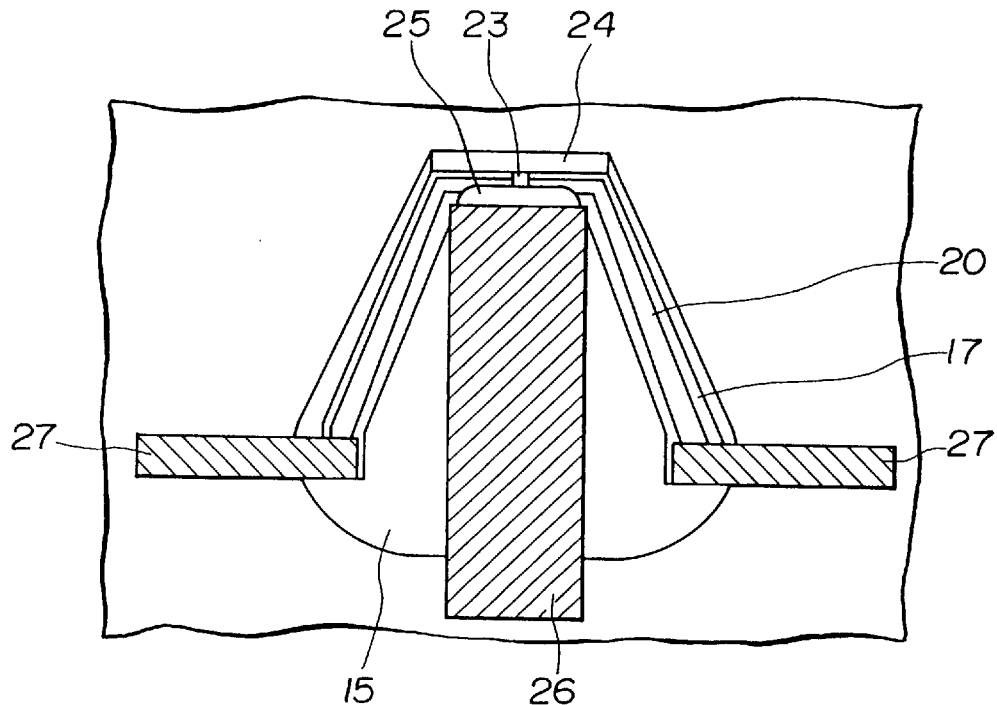
FIG. 25 sequentially shows the process of fabrication of the MR head according to the present invention and specifically shows, in a plan view, the process of forming electrodes.

A forward electrode 24 is then formed at the forward end of the MR device 23, as shown in FIG. 25. A flux guide 25 is then formed at the rear side of the MR device 23.

A rear electrode 26 is then formed with a partial overlap with the flux guide 25. A bias lead-out conductor 27 connected to both ends of the bias conductor 20 embedded in the groove 17 is formed as the same layer with the rear electrode 26. The bias lead-out conductor 27 may be formed by a separate step from the step of forming the rear electrode 26. However, since the bias lead-out conductor 27 may be formed of the same electrode material and to the same film thickness as the rear electrode 26, they are formed simultaneously in the present embodiment.

Figure 26:
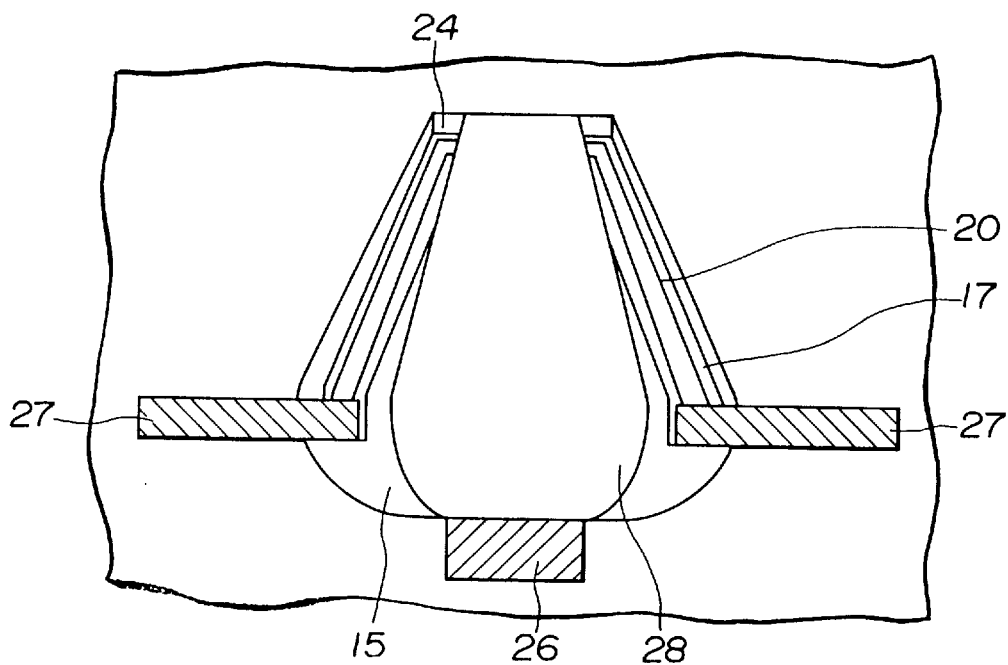
FIG. 26 sequentially shows the process of fabrication of the MR head according to the present invention and specifically shows, in a plan view, the process of forming an upper shielding magnetic member.

An upper shielding magnetic member 28 is then laminated via an insulating layer, as shown in FIG. 26. The upper shielding magnetic layer 28 is formed as a pattern smaller in size than the lower shielding magnetic member 15 so that the connecting portion between the bias conductor 20 and the bias lead-out conductor 27 is not overlapped with the upper shielding magnetic member 28.

This positively eliminates inferior insulation between the bias lead-out conductor 27 and the upper shielding magnetic member 28 which may be used simultaneously as a lead-out conductor of the MR device 23.

The MR head is completed by annexing terminal portions, not shown.

What is claimed is:

1. A magneto-resistance effect magnetic head comprising:
an upper shielding magnetic member located opposite a lower shielding magnetic member sandwiching a magneto-resistance effect magnetic device and wherein a bias conductor is embedded in a groove formed exclusively in the lower shielding magnetic member and wherein the bias conductor is surrounded by an insulating material and the bias conductor has a connection to a bias lead-out conductor, wherein the lower shielding magnetic member is larger in size than said upper shielding magnetic member and wherein the connection between the bias lead-out conductor and the bias conductor does not overlap with the upper shielding magnetic member such that no magnetic shielding is provided above the connection while magnetic shielding is provided below the connection.

* * * * *